US012654113B2

(12) United States Patent
    Pickens, III et al.

(10) Patent No.: US 12,654,113 B2
(45) Date of Patent: Jun. 16, 2026

(54) CHEMICAL DISTILLATION SYSTEM WITH IN SITU ANALYTICS

(71) Applicant: Astrotech Technologies, Inc., Austin, TX (US)

(72) Inventors: Thomas B. Pickens, III, Austin, TX (US); Eric Wallis, Leander, TX (US); Christopher Saphos, Austin, TX (US); David Allen, Leander, TX (US); Zachary Winfield, Austin, TX (US); Kayla Sarantakos, Austin, TX (US)

(73) Assignee: Astrotech Technologies, Inc., Austin, TX (US)

( * ) Notice: Subject to any disclaimer, the term of this patent is extended or adjusted under 35 U.S.C. 154(b) by 0 days.

(21) Appl. No.: 19/202,657

(22) Filed: May 8, 2025

(65) Prior Publication Data

US 2025/0345722 A1 Nov. 13, 2025

Related U.S. Application Data

(60) Provisional application No. 63/645,279, filed on May 10, 2024.

(51) Int. Cl.
| | |
|---|---|
| *B01D 3/10* | (2006.01) |
| *B01D 1/22* | (2006.01) |
| *B01D 3/42* | (2006.01) |
| *B01D 53/02* | (2006.01) |
| *C07B 63/00* | (2006.01) |
| *G01N 30/02* | (2006.01) |
| (Continued) | |

(52) U.S. Cl.
CPC ........... *B01D 3/4294* (2013.01); *B01D 1/225* (2013.01); *B01D 3/10* (2013.01); *B01D 53/025* (2013.01); *C07B 63/00* (2013.01);

*G01N 30/04* (2013.01); *G01N 30/16* (2013.01); *G01N 2030/025* (2013.01); *G01N 2030/045* (2013.01)

(58) Field of Classification Search
CPC ....... G01N 30/16–24; G01N 2030/045; G01N 2030/625; G01N 2030/626
See application file for complete search history.

(56) References Cited

U.S. PATENT DOCUMENTS

| | | | |
|---|---|---|---|
| 3,009,864 A | 11/1961 | Webb | |
| 3,121,677 A | 2/1964 | Coggeshall et al. | |
| (Continued) | | | |

FOREIGN PATENT DOCUMENTS

| | | |
|---|---|---|
| CA | 2133398 A1 | 3/1996 |
| DE | 19803711 A1 | 8/1999 |
| (Continued) | | |

OTHER PUBLICATIONS

Invitation to Pay Additional Fees and, Where Applicable, Protest Fee issued by the United States Patent and Trademark Office as International Searching Authority for International Application No. PCT/US2025/028438, dated Jul. 1, 2025. (3 pgs.).

(Continued)

*Primary Examiner* — Jonathan Luke Pilcher

(74) *Attorney, Agent, or Firm* — Haynes and Boone, LLP

(57) ABSTRACT

An automated distillation system includes a distillation process under vacuum, a sampling device for extracting a vapor sample of distillate, a gas analyzer for measuring a property of the vapor sample, and a controller for analyzing the property and appropriately adjusting one or more parameters of the system, such as a level of vacuum, in response to the analysis.

13 Claims, 3 Drawing Sheets

(51) Int. Cl.
    *G01N 30/04*      (2006.01)
    *G01N 30/16*      (2006.01)

(56)            References Cited

U.S. PATENT DOCUMENTS

| | | | |
|---|---|---|---|
| 3,239,432 | A | 3/1966 | Rhodes et al. |
| 3,255,595 | A | 6/1966 | Case, Jr. et al. |
| 3,364,731 | A | 1/1968 | Hook |
| 3,436,337 | A | 4/1969 | Boyd |
| 3,732,723 | A | 5/1973 | Goolsby et al. |
| 3,793,157 | A | 2/1974 | Hobbs et al. |
| 3,897,314 | A | 7/1975 | Liebsch et al. |
| 3,905,873 | A | 9/1975 | Wright et al. |
| 3,911,259 | A | 10/1975 | Huddleston et al. |
| 3,985,623 | A | 10/1976 | Morgan et al. |
| 3,997,432 | A | 12/1976 | Louvel et al. |
| 4,007,112 | A | 2/1977 | Benker et al. |
| 4,025,397 | A | 5/1977 | Green |
| 4,028,194 | A | 6/1977 | Boyd |
| 4,250,739 | A | 2/1981 | Audeh et al. |
| 4,262,791 | A | 4/1981 | Lynch et al. |
| 4,298,363 | A | 11/1981 | Campbell et al. |
| 4,427,305 | A | 1/1984 | Plys et al. |
| 4,479,851 | A | 10/1984 | Smith et al. |
| 4,488,936 | A | 12/1984 | Preusser et al. |
| 4,528,635 | A | 7/1985 | Juodikis et al. |
| 4,617,092 | A | 10/1986 | Hiramatsu |
| 4,624,746 | A | 11/1986 | Hiramatsu |
| 4,759,825 | A | 7/1988 | Medvey et al. |
| 4,828,660 | A | 5/1989 | Clark et al. |
| 5,047,125 | A | 9/1991 | Meier et al. |
| 5,132,918 | A | 7/1992 | Funk |
| 5,302,255 | A | 4/1994 | Dorai et al. |
| 5,464,504 | A | 11/1995 | Beauford |
| 5,640,491 | A | 6/1997 | Bhat et al. |
| 5,698,158 | A | 12/1997 | Lam et al. |
| 5,895,506 | A | 4/1999 | Cook et al. |
| 5,976,323 | A | 11/1999 | Milde et al. |
| 6,113,860 | A | 9/2000 | Manninen |
| 6,297,353 | B1 | 10/2001 | Fuenzalida Diaz et al. |
| 6,413,378 | B1 | 7/2002 | Kanauchi et al. |
| 6,462,210 | B1 | 10/2002 | Diaz et al. |
| 6,551,465 | B1 | 4/2003 | Van Zile et al. |
| 6,581,443 | B2 | 6/2003 | Abaev et al. |
| 6,638,397 | B1 | 10/2003 | Camiener et al. |
| 6,911,120 | B2 | 6/2005 | Young |
| 7,208,570 | B2 | 4/2007 | Saviainen |
| 7,211,193 | B2 | 5/2007 | Inada et al. |
| 7,292,899 | B2 | 11/2007 | Dadebo et al. |
| 7,507,273 | B1 | 3/2009 | Massie |
| 7,985,323 | B2 | 7/2011 | Beutler et al. |
| 8,216,429 | B2 | 7/2012 | Pihlaja et al. |
| 8,372,247 | B2 | 2/2013 | Urvantsau et al. |
| 8,419,903 | B2 | 4/2013 | Bahr |
| 8,524,046 | B2 | 9/2013 | Beadle et al. |
| 8,608,912 | B2 | 12/2013 | Noe et al. |
| 8,741,109 | B2 | 6/2014 | Nelson et al. |
| 8,752,576 | B2 | 6/2014 | Na |
| 8,821,696 | B2 | 9/2014 | Noe et al. |
| 9,169,263 | B1 | 10/2015 | Ryu et al. |
| 9,327,208 | B2 | 5/2016 | Ramirez Corredores et al. |
| 9,744,200 | B1 | 8/2017 | Tucker et al. |
| 10,000,723 | B2 | 6/2018 | Young et al. |
| 10,226,716 | B2 | 3/2019 | Fabbian |
| 10,363,495 | B2 | 7/2019 | Urvantsau et al. |
| 10,758,839 | B1 | 9/2020 | Lantz |
| 10,983,044 | B2 | 4/2021 | Metting et al. |
| 10,995,277 | B2 | 5/2021 | Cross et al. |
| 11,045,742 | B2 | 6/2021 | Wunz et al. |
| 11,052,324 | B2 | 7/2021 | Piszczek et al. |
| 11,105,787 | B2 | 8/2021 | Kumar KN et al. |
| 11,235,260 | B2 | 2/2022 | Schweigert et al. |
| 11,369,894 | B1 | 6/2022 | Lee et al. |
| 11,401,471 | B2 | 8/2022 | Wang |
| 11,459,512 | B1 | 10/2022 | Lee et al. |
| 11,707,698 | B2 | 7/2023 | Pan |
| 2003/0109729 | A1 | 6/2003 | Diaz et al. |
| 2005/0004413 | A1 | 1/2005 | Kanauchi et al. |
| 2005/0040026 | A1 | 2/2005 | Grub et al. |
| 2006/0021866 | A1 | 2/2006 | Cheng |
| 2006/0076227 | A1 | 4/2006 | Beutler et al. |
| 2007/0256920 | A1 | 11/2007 | Kanauchi et al. |
| 2009/0165653 | A1 | 7/2009 | Torii et al. |
| 2013/0284579 | A1 | 10/2013 | Corredores et al. |
| 2014/0012058 | A1 | 1/2014 | Beadle et al. |
| 2014/0099688 | A1 | 4/2014 | Grady et al. |
| 2014/0144767 | A1 | 5/2014 | Jost et al. |
| 2014/0275465 | A1 | 9/2014 | Garikipati et al. |
| 2015/0105570 | A1 | 4/2015 | Summers et al. |
| 2015/0209688 | A1 | 7/2015 | Young et al. |
| 2016/0031778 | A1 | 2/2016 | Garikipati et al. |
| 2018/0119033 | A1 | 5/2018 | Tirmizi et al. |
| 2020/0122054 | A1 | 4/2020 | Stantchev |
| 2020/0222828 | A1 | 7/2020 | Rutz et al. |
| 2020/0332221 | A1 | 10/2020 | Hirai et al. |
| 2020/0398180 | A1 | 12/2020 | Hospodor et al. |
| 2021/0251157 | A1 | 8/2021 | Leo |
| 2021/0283043 | A1 | 9/2021 | Lepilleur et al. |
| 2021/0395109 | A1 | 12/2021 | LaRocque et al. |
| 2021/0396724 | A1 | 12/2021 | Cai et al. |
| 2022/0249971 | A1 | 8/2022 | Carver |
| 2022/0249972 | A1 | 8/2022 | Varver |
| 2022/0266164 | A1 | 8/2022 | Adair et al. |
| 2022/0331710 | A1 | 10/2022 | Karaki et al. |
| 2022/0332693 | A1 | 10/2022 | Adair et al. |
| 2022/0364788 | A1 | 11/2022 | Bashir et al. |
| 2023/0002340 | A1 | 1/2023 | Adair et al. |
| 2023/0100425 | A1 | 3/2023 | Lépinay et al. |
| 2023/0191278 | A1 | 6/2023 | Pan |
| 2024/0003784 | A1 | 1/2024 | Hart |

FOREIGN PATENT DOCUMENTS

| | | |
|---|---|---|
| DE | 102007033540 A1 | 2/2009 |
| DE | 102009059833 A1 | 6/2011 |
| JP | 2002267580 A | 9/2002 |

OTHER PUBLICATIONS

International Search Report and Written Opinion of the International Search Authority issued by the United States Patent and Trademark Office for International Application No. PCT/US2025/028438 dated Aug. 26, 2025. (14 pages).

CHEMICAL DISTILLATION SYSTEM WITH IN SITU ANALYTICS

CROSS-REFERENCE TO RELATED APPLICATIONS

This application claims priority from U.S. Provisional Application No. 63/645,279 filed May 10, 2024, and entitled CHEMICAL DISTILLATION SYSTEM WITH IN SITU ANALYTICS, which is hereby incorporated by reference in its entirety.

TECHNICAL FIELD

The present disclosure relates to increasing the efficiency of a distillation processing system using advanced analytical instrumentation.

BACKGROUND

Distillation Systems ("Distillation System" or the "System") separate a liquid starting material ("Feedstock") into fractions based on boiling point and vapor pressure ("Distillate" or "Distillation"). The Feedstock is distilled by controlling components or variables (the "Parameters" or "Parameter Settings") of the System including, temperature, pressure, pump speed, wiper speed, and fluid flow rate. The Parameters are set at the beginning of the distillation process (the "Distillation Process" or "Process") and adjusted throughout the processing period ("Processing Period"). During the Distillation Process, components of the Feedstock separate as they transition from the liquid phase to the gas phase ("Process Gas") as they are heated to a selected evaporation temperature ("Boiling Point"). The Process Gas is then converted to a final condensed liquid product (the "Distillate") through exposure to a cold element condenser.

Current processing procedures typically follow a protocol of established Parameters. Any changes to the initial Parameters throughout the Processing Period are typically based on a visual inspection. System Parameters are manually changed based off previous experience and estimates to maximize the concentration and reduce the loss of the final distillate material of the desired product in the Distillate material ("Potency" or "Potency Yields") and to limit loss of product mass during processing ("Weight Yields").

BRIEF DESCRIPTION OF DRAWINGS

Embodiments of the subject matter are disclosed with reference to the accompanying drawings and are for illustrative purposes only. The subject matter is not limited in its application to the details of construction or the arrangement of the components illustrated in the drawings. Like reference numerals are used to indicate like components, unless otherwise indicated.

DETAILED DESCRIPTION

The following descriptions are provided to explain and illustrate embodiments of the present disclosure. The described examples and embodiments should not be construed to limit the present disclosure.

Figure 1:
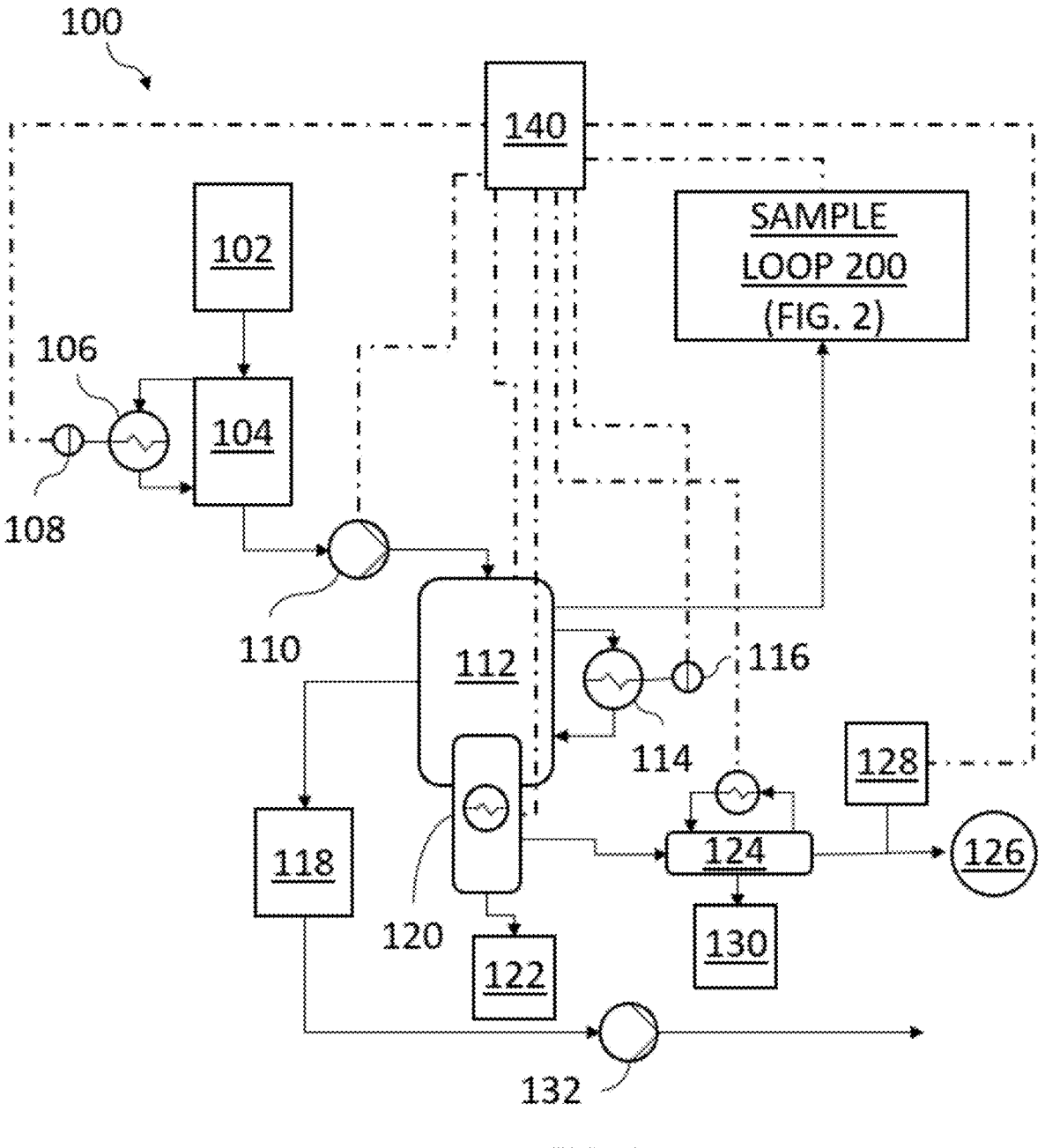
FIG. 1 is a diagrammatic illustration of an automated distillation system according to an embodiment of the present disclosure.

Referring to FIG. 1, an automated distillation system 100 is shown. The system 100 receives a feedstock from a feedstock process 102, which may be a part of the system 100 or a separate system. The feedstock is not particularly limited and may include any liquid capable of being distilled. For example, the feedstock may include a combination of components, such as hydrocarbon and/or alcohols, which are selectively separable based on differing volatility (boiling point and vapor pressure). In some embodiments, the feedstock comprises a cannabinoid or a blend of cannabinoids. In such embodiments, the feedstock process 102 may include a decarboxylation process to convert cannabinoid acids from a crude oil to neutral cannabinoids in the feedstock. The more abundant forms of neutral cannabinoids include tetrahydrocannabinol (THC), cannabidiol (CBD), cannabichromene (CBC), and cannabigerol (CBG). Other neutral cannabinoids include, but are not limited to, cannabidivarin (CBDV), cannabichromevarin (CBCV), cannabigerovarin (CBGV), cannabielsoin (CBE), cannabicyclol (CBL), cannabivarin (CBV), cannabitriol (CBT), tetrahydrocannibivarin (THCV), cannabigerol monomethyl ether (CBGM), nabilone, and rimonabant. In some embodiments, the feedstock comprises a cannabinoid and an impurity to be separated from the cannabinoid using the system 100. The impurity may include another cannabinoid or a naturally occurring component of the *Cannabis sativa* plant, such as terpenes, terpenoids, sterols (such as phytosterols), triglycerides, alkanes, squalenes, tocopherols, carotenoids, flavonoids, polyphenols, cannflavins, and alkaloids. In any embodiment, the feedstock may include one or more solvents. In some embodiments, the solvents are nonvolatile at the distillation temperature of the system 100. In some embodiments, the feedstock process 102 is a distillation process.

In the system 100, the feedstock from the feedstock process 102 is directed to a heated feed tank 104. The feed tank 104 includes a heater 106, wherein the feed tank 104 and/or the heater 106 may be monitored by one or more sensors 108. The sensors 108, and any other sensors referenced herein, may include one or more of a temperature sensor, a pressure sensor, a flow meter, a liquid level meter, and the like. The sensors 108 are in communication with a controller 140, which may be configured to adjust parameters of the feed tank 104 in response to information received from the sensors 108. The dashed lines in FIG. 1 between the controller 140 and various components of the system 100 may include any appropriate data communication link, such as a wired or wireless link. The feedstock may be maintained at a predetermined temperature within the feed tank 104 based on the nature of the feedstock. For example, the predetermined temperature may be set below a boiling point of the lowest boiling point component of the feedstock.

The heated feedstock is pumped from the feed tank 104 via pump 110 to a distillation process. The distillation process is not particularly limited and may include, for example, a short path distillation process or a molecular distillation process. The pump 110 may be in communication with, and controllable by, the controller 140. In FIG. 1, the distillation process is a short path distillation process, and the heated feedstock is directed into an evaporator 112. An evaporator heater 114 provides heat to the evaporator 112. The heater 114 and/or the evaporator 112 may include one or more sensors 116 for measuring conditions of the distillation process and communicating the same to the controller 140. The evaporator 112 may also be in communication with the controller 140, and the controller 140 may control operating conditions within the evaporator 112.

In some embodiments, the evaporator 112 is a wiped film evaporator. The wiped film evaporator 112 operates by spreading the feedstock along walls of the evaporator 112 via rollers, which may extend along most of the length of the evaporator 112. A film of feedstock is more readily evaporated, and the input speed of feedstock and rotational speed of the rollers can be controlled (via controller 140) to achieve a desired film thickness. The walls of the evaporator 112 are heated via heater 114, which drives compounds out of the liquid feedstock into a vapor phase, which can then be condensed into a distillate using condenser 120 and collected in collection tank 122 separate from the non-vapor components of the feedstock. Other forms of short path distillation (e.g., without wiped film rollers) may operate in a similar manner and include similar components as described herein. The condenser 120 is cooled to facilitate condensation and conditions of the condenser 120, such as temperature, may be controlled by the controller 140.

The evaporator 112 and/or the condenser 120 may be under vacuum, i.e., less than 750 torr. In some embodiments, the vacuum level is at most 100 torr, at most 10 torr, at most 1 torr, less than 1 torr, 0.01 to 0.5 torr, 0.01 to 0.3 torr, about 0.225 torr, at most 0.1 torr, at most 0.01 torr, or at most 0.001 torr. Vacuum pump 126 may be used to apply a vacuum to the distillation process and may be controlled by a vacuum controller 128. The vacuum controller 128 may be in communication with the controller 140. In some embodiments, the vacuum controller 128 may be part of the controller 140. In some embodiments, controlling the level of vacuum in the system 100 includes modifying operation of the vacuum pump 126 and/or operating a valve within the distillation process. Such operations may be controlled using the controller 140. The vacuum pump 126 may include a cold trap 124 and a vacuum trap 130 to protect the vacuum pump 126 from any volatile components of the feedstock that were not condensed in the condenser 120. In some embodiments, the cold trap may be set at around −40° C. In some embodiments, the temperature of the cold trap 124 is controllable by the controller 140. Materials collected in the cold trap 124 may be a waste stream or may be diverted for additional processing or storage.

Non-vaporized components from the distillation process, a "residue," may be directed from evaporator 112 to a residue tank 118. A pump 132 may direct the residue from the residue tank 118 for additional processing, storage, or disposal. In some embodiments, the distillate in the collection tank 122 may be a waste product and the residue may be a desired product. In other embodiments, the distillate may be a desired product, and the residue may be a waste product. In any embodiment, the distillate and/or residue may undergo further processing. For example, for a cannabinoid feedstock, the system 100 may first remove undesirable, highly volatile components ("heads") from the feedstock as the distillate. The residue may then be transferred via pump 132 to a heated feed tank of a second distillation process ("a second stage") including the same components as the system 100. The second distillation process may be the same as described above but conditions such as temperature and vacuum can be adjusted to separate remaining components within the residue.

Figure 2:
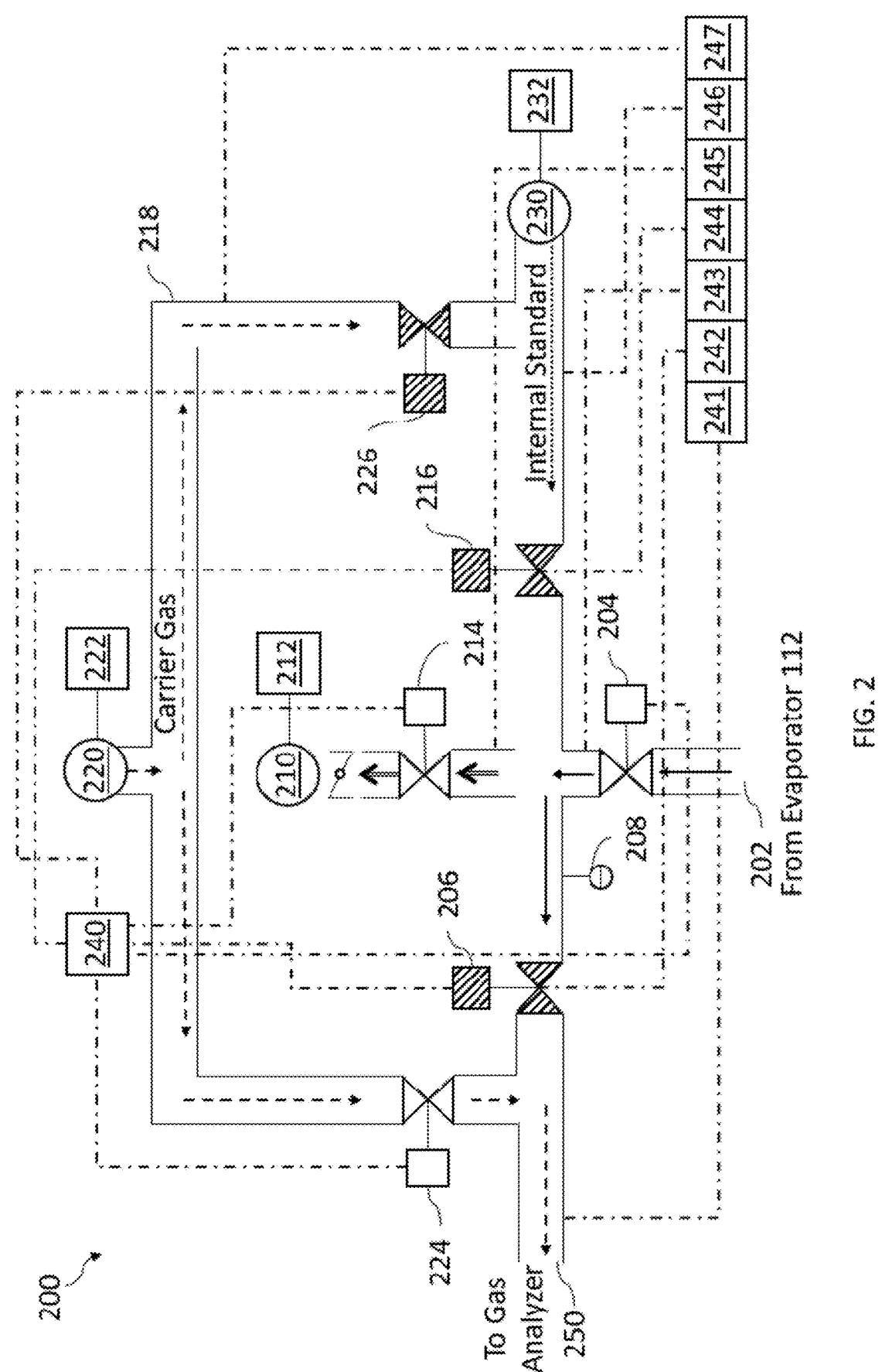
FIG. 2 is a diagrammatic illustration of a sample loop within the system of FIG. 1 in a collection phase according to an embodiment of the present disclosure.

A sample of vaporized distillate is extracted from the evaporator 112 and delivered to the sample loop 200 for analysis. The sample loop 200 is shown in detail in FIGS. 2 and 3. Referring to FIG. 2, when the sample loop 200 is in a collection mode, a vacuum pump 210, controllable by a vacuum controller 212, draws a vacuum in the sample loop 200 in order to overcome the vacuum within the evaporator 112. In some embodiments, the vacuum in the sample loop 200 is equal to or greater than a vacuum within the evaporator. During the collection phase, valves 204, 214, and 224 are opened by a valve controller 240 and the sample gas is drawn into the sample loop 200 via sample loop entry 202. At the same time, the valve controller 240 controls valves 206, 216, and 226 to be in a closed position. In some embodiments, the valves 204, 206, 214, 216, 224 and 226 are gate valves.

Figure 3:
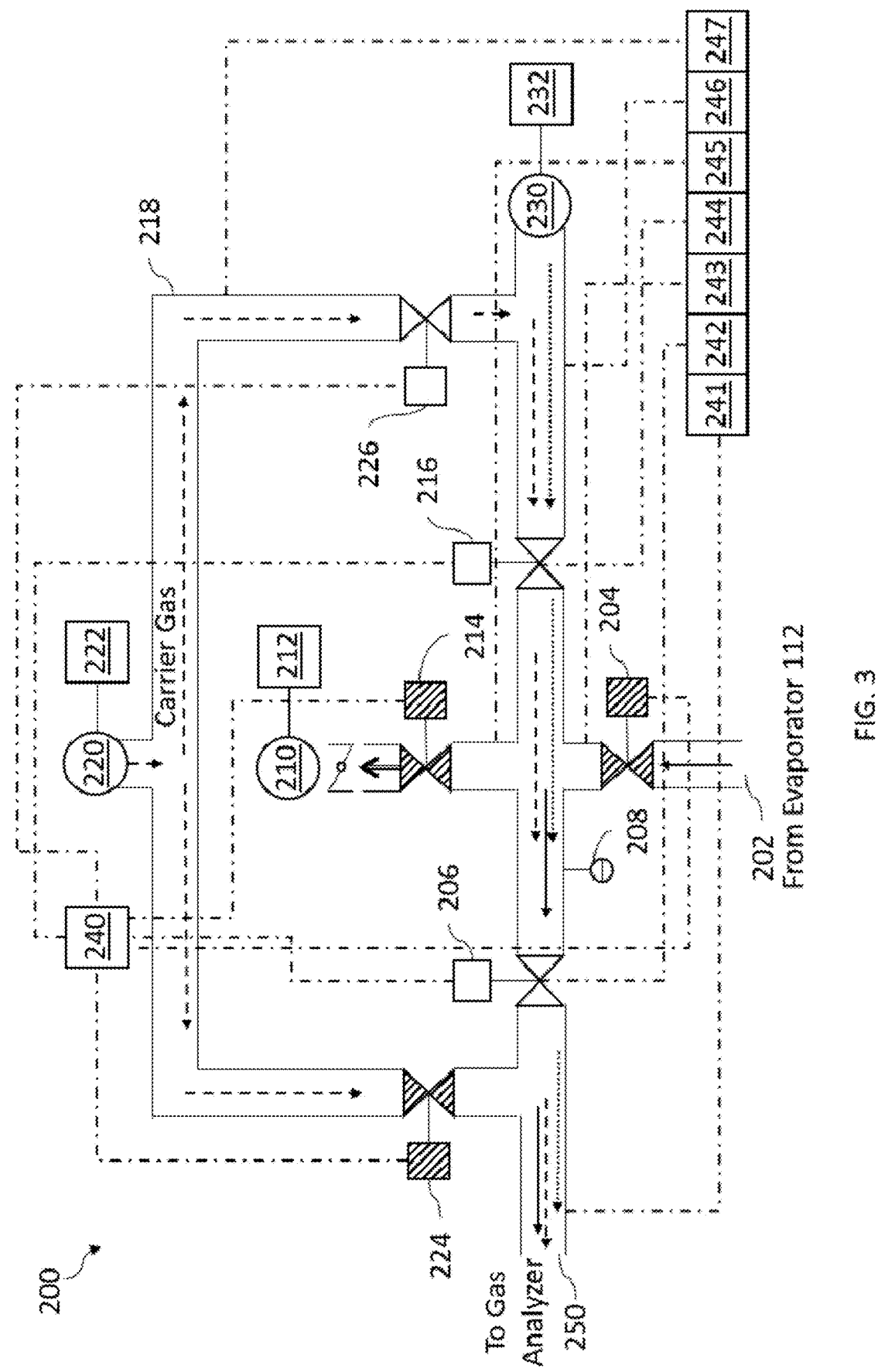
FIG. 3 is a diagrammatic illustration of a sample loop within the system of FIG. 1 in an analysis phase according to an embodiment of the present disclosure.

With reference to FIG. 3, when the sample loop 200 is in an analysis phase, valves 204, 214, and 224 are closed by the valve controller 240 and valves 206, 216, and 226 are opened by the valve controller 240. This action allows for the sample gas to be mixed with a carrier gas and an internal standard, and to be transported to a gas analyzer via sample loop exit 250. Flow of the sample gas is shown by solid arrows in FIGS. 2 and 3. The carrier gas may be supplied through a carrier gas port 220 controllable by a carrier gas controller 222. In some embodiments, the carrier gas is zero air (atmospheric air containing less than 0.1 ppm of hydrocarbon impurities). Flow of the carrier gas is shown by dashed arrows in FIGS. 2 and 3. The internal standard is a gas that aids in the measurement of the sample by the gas analyzer. The internal standard may be selected in view of the target compound or compounds of the distillation process. The internal standard may be supplied through an internal standard port 230 controllable by an internal standard controller 232, which may supply a predetermined amount of internal standard. Flow of the internal standard is shown by dotted arrows in FIGS. 2 and 3. In some embodiments, the valve controller 240, the vacuum controller 212, the carrier gas controller 222, and/or the internal standard controller 232 may be in communication with one another and/or in communication with the controller 140.

The sample loop 200 may include one or more sensors, such as pressure sensor 208. Other sensors, such as those described above may be included at various points within the sample loop 200 and any such sensors may relay measured parameters to a controller, such as controller 140.

As shown in FIGS. 2 and 3, the sample loop 200 comprises conduits 218 through which the various gases described herein flow. The conduits 218 may be temperature controlled to, e.g., prevent the sample gas from condensing. The temperature control may be achieved via, e.g., one or more heaters such as a jacketed sleeve. Temperature controllers 241-247 may independently monitor and control various portions of the sample loop 200, as shown in FIGS. 2 and 3. In some embodiments, each of the temperature controllers 241-247 control all portions of the sample loop 200 to be substantially the same temperature. Temperature controllers 241-247 may be in communication with other parts of the system 100, such as the controller 140. Although seven temperature controllers are shown, the sample loop 200 may include any number of temperature controllers, e.g., a single temperature controller, or the temperature control may be achieved by another controller within the system 100.

In some embodiments, the gas analyzer is spectrometer, such as a mass spectrometer. In some embodiments, the gas analyzer is a gas chromatograph or other gas phase analytical instrumentation. Readings from the gas analyzer, such as mass spectrometer spectra, are analyzed for compounds of interest. The gas analyzer may be in communication with, e.g., controller 140, which may perform said analysis. In response to the analysis of the gas analyzer readings, the controller 140 may adjust one or more parameters of the system 100. For example, the controller 140 may alter the temperature of the heated feed tank 104, the rate of pump 110, the temperature and/or wiper rotational speed of the evaporator 112, the temperature of the condenser 120, the temperature of the cold trap 124, the level of vacuum provided by the vacuum pump 126, rate of pump 132 or combinations thereof. When the residue is to be processed in a second stage, as disclosed above, the controller 140 may control any of the foregoing parameters in the second stage. The controller 140 may also or alternatively moderate conditions within the sample loop 200, such as vacuum level provided by vacuum pump 210, temperature of the conduits 218, flow rate of carrier gas through carrier gas port 220, flow rate of internal standard through internal standard port 230, or combinations thereof.

In some embodiments, the controller 140 is a programmable logic controller. In some embodiments, the controller 140 may include a user interface, which may display, e.g., operating parameters of the system 100, sample gas analysis information, and/or historical readings and adjustments made by the controller 140.

In some embodiments, the controller 140 is configured to at least adjust the pressure within the evaporator 112 via the vacuum controller 128 and vacuum pump 126. In existing methods of distillation process control using temperature as the primary regulator, it may take 10-15 minutes for the temperature to stabilize to the desired level. During that time, suboptimal distillate is being produced, and yields and/or potency of the process are reduced. Modifying the pressure can achieve near instantaneous adjustments without substantial yield loss.

Atmospheric equivalent temperature (AET) complicates the distillation process and makes fractionation inconsistent. Using observable boiling points for targeted distillate molecules is not an efficient tactic as boiling points are dynamic and change drastically depending on a system's environment. The automated distillation system 100 disclosed herein overcomes these obstacles and allows for continuous, accurate measurement of distillate composition and for precise adjustments to maximize yield or potency.

Although the present disclosure has been described using preferred embodiments and optional features, modification and variation of the embodiments herein disclosed can be foreseen by those of ordinary skill in the art, and such modifications and variations are considered to be within the scope of the present disclosure. It is also to be understood that the above description is intended to be illustrative and not restrictive. For instance, it is noted that the diameter, length, thickness, and density values described above are illustrative only and can be readily adjusted by one of ordinary skill in the art to fit a wide range of potential reactors and processes. M any alternative embodiments will be apparent to those of ordinary skill in the art upon reviewing the above description. Additionally, the terms and expressions employed herein have been used as terms of description and not of limitation, and there is no intention in the use of such terms and expressions of excluding any equivalents of the future shown and described or any portion thereof, and it is recognized that various modifications are possible within the scope of the disclosure.

What is claimed is:

1. A distillation system comprising:
   a feedstock supply comprising a feedstock liquid including a volatile compound;

an evaporator in fluid communication with the feedstock supply, the evaporator comprising a sample port and configured to vaporize the volatile compound;

a condenser in fluid communication with the evaporator, the condenser configured to condense the vaporized volatile compound into a distillate;

a vacuum pump configured to reduce a pressure within the evaporator to less than 750 torr;

a sampling device in fluid communication with the sample port of the evaporator and configured to withdraw a sample of the vaporized volatile compound, the sampling device comprising a gas analyzer configured to measure a property of the sample; and a controller in communication with the gas analyzer and configured to analyze the property of the sample and adjust a parameter of the system in response to the analysis of the property;

wherein the sampling device further comprises:
   a sample loop comprising an outlet in fluid communication with the gas analyzer and an inlet in fluid communication with the sample port of the evaporator;
   a second vacuum pump in fluid communication with the sample loop via a vacuum valve and configured to produce a pressure within the sample loop that is equal to or less than the pressure within the evaporator;
   a carrier gas port configured to introduce a carrier gas into the sample loop;
   an internal standard port configured to introduce an internal standard gas into the sample loop; and
   a plurality of valves; and wherein the sampling device is configured to operate in a collection mode wherein, via the plurality of the valves, the second vacuum pump, the inlet of the sample loop, and the internal standard port are isolated from the outlet and the carrier gas port is not isolated from the outlet.

2. The system of claim 1, wherein the gas analyzer is a gas chromatograph.

3. The system of claim 1, wherein the volatile compound comprises cannabinoids.

4. The system of claim 1, wherein the parameter is a pressure within the evaporator and the controller is configured to modulate operation of the vacuum pump.

5. The system of claim 4, wherein the controller is further configured to independently adjust a second parameter of the system in response to the analysis of the property.

6. The system of claim 5, wherein the second parameter is a temperature of the feedstock supply, a supply rate of the volatile compound from the feedstock supply, a temperature of the evaporator, or a temperature of the condenser.

7. The system of claim 1, wherein the evaporator is a wiped film evaporator.

8. The system of claim 7, wherein the parameter is a wiper rotational speed of the wiped film evaporator.

9. The system of claim 1, wherein the parameter is a temperature, pressure, or flow rate within the sampling device.

10. The system of claim 1, wherein the sampling device further comprises a heater configured to prevent condensation of the vaporized volatile compound.

11. The system of claim 10, wherein the parameter is a temperature within the sampling device and the controller is configured to modulate operation of the heater.

12. The system of claim 1, wherein the parameter is a pressure within the sampling device and the controller is configured to modulate operation of the second vacuum pump.

13. The system of claim 1, wherein the plurality of valves comprises:

an inlet valve at the inlet of the sample loop;

a vacuum valve between the second vacuum pump and the sample loop; and a first internal valve, a second internal valve, a third internal valve, and a fourth internal valve each positioned within the sample loop;

wherein, in the collection mode the inlet valve and the vacuum valve are in an open position and the first internal valve and the second internal valve are in a closed position to draw the sample into a portion of the sample loop that is isolated from the internal standard port, the carrier gas port, and the outlet;

the third internal valve is in a closed position to isolate the internal standard port from the carrier gas port and the outlet; and the fourth internal valve is in an open position between the carrier gas port and the outlet; and wherein the sampling device is further configured to operate in an analysis mode wherein the inlet valve, the vacuum valve, and the fourth internal valve are in an closed position; and the first internal valve, the second internal valve, and the third internal valve are in an open position to allow the carrier gas and the internal standard gas to mix with the sample and flow to the outlet.

* * * * *